US 6,724,165 B2

(12) United States Patent        (10) Patent No.:     US 6,724,165 B2
Hughes                           (45) Date of Patent:    Apr. 20, 2004

(54) REGENERATIVE BRAKING SYSTEM FOR AN ELECTRIC VEHICLE

(75) Inventor: Peter S. Hughes, South Harwich, MA (US)

(73) Assignee: Vectrix Corporation, Newport, RI (US)

( * ) Notice: Subject to any disclaimer, the term of this patent is extended or adjusted under 35 U.S.C. 154(b) by 214 days.

(21) Appl. No.: 10/093,717

(22) Filed: Mar. 11, 2002

(65) Prior Publication Data
US 2003/0169002 A1 Sep. 11, 2003

(51) Int. Cl.[7] .............................. H02P 3/14; H02P 3/18
(52) U.S. Cl. ........................................ 318/376; 303/152
(58) Field of Search ................................. 318/371, 372, 318/375, 376, 363; 303/3, 15, 20, 151, 152; 180/65.1–65.3, 65.6, 65.7, 165

(56) References Cited
U.S. PATENT DOCUMENTS

| | | | |
|---|---|---|---|
| 5,148,883 A | 9/1992 | Tanaka ........................ 180/165 |
| 5,378,053 A | 1/1995 | Patient ........................... 303/3 |
| 5,384,522 A | 1/1995 | Toriyama ..................... 318/371 |
| 5,615,933 A | 4/1997 | Kidston ....................... 303/152 |
| 5,644,202 A | 7/1997 | Toriyama ..................... 318/369 |
| 5,654,887 A | 8/1997 | Asa ...................... 364/424.026 |
| 5,839,533 A | * 11/1998 | Mikami et al. ............. 180/165 |
| 5,839,800 A | * 11/1998 | Koga et al. ................. 303/152 |
| 5,915,801 A | * 6/1999 | Taga et al. .................. 303/152 |
| 6,011,378 A | 1/2000 | Tabata ......................... 318/759 |
| 6,086,166 A | * 7/2000 | Fukasawa ................... 303/152 |

* cited by examiner

Primary Examiner—Jeffrey Donels
(74) Attorney, Agent, or Firm—Winston & Strawn LLP

(57) ABSTRACT

A regenerative braking system for an electric vehicle having front and rear wheels, and includes a drive wheel, an actuating device, a regenerative braking control circuit, and a power electronics circuit. The regenerative braking control circuit includes a potentiometer ir transducer, a process sensor, and a microprocessor. The system applies a regenerative braking torque to the drive wheel when the rider commands regenerative braking, and the process sensors signal a drive wheel velocity greater than zero. The present invention also relates to a throttle for actuating regenerative braking and reversing feature.

30 Claims, 5 Drawing Sheets

REGENERATIVE BRAKING SYSTEM FOR AN ELECTRIC VEHICLE

FIELD OF THE TECHNICAL FIELD

The present invention generally relates to an electric vehicle having a regenerative braking system used to recover energy for an on-board rechargeable power supply. More particularly, the invention relates to rider controlled actuating devices for the regenerative braking system.

BACKGROUND OF THE INVENTION

As exacerbation of air pollution by large numbers of internal combustion vehicles has become a significant concern in large cities, efforts are being made worldwide to provide efficient electric powered vehicles which do not discharge pollutant emissions. Large cities in developing countries which include high concentrations of scooters powered by two stroke engines are particularly affected by vehicle pollution. These two stroke scooters produce large quantities of pollutants and significant noise. Electric powered scooters, on the other hand, offer a means of transportation that emits substantially no pollutants and produces very little noise.

Electric scooters typically have a bank of batteries which provide power to a drive motor. These batteries must be recharged from time to time. This is typically done by plugging the batteries into an AC power outlet for a period of time to restore the depleted energy. However, to improve the autonomy of a vehicle, there is reason to place battery charging units and battery energy conserving units permanently onboard electric scooters. In particular, regenerative braking systems can be used to transform kinetic energy of the vehicle back into electrical energy to help recharge the vehicle batteries during the braking mode. This provides a braking system that is more energy efficient, and simpler, than that provided by friction brakes.

One system known for controlling regenerative braking in an electric vehicle is disclosed in U.S. Pat. No. 5,644,202 which teaches a regenerative braking control system that is capable of individually controlling braking force and recharging energy. The braking force and recharging energy are set based on the charge of the battery and motor speed to obtain an optimal braking force and an optimal recharging current. The system teaches establishing an optimal braking force and then providing a recharging current that is optimized so that the recharging current is increased when the battery voltage is low and is decreased when the battery voltage is high.

Another regenerative braking system for an electric vehicle is known from U.S. Pat. No. 5,615,933 which discloses a four wheeled vehicle having an electric propulsion motor, a regenerative brake control, and a friction anti-lock brake system (ABS) in which regenerative braking may be blended with friction braking when anti-lock braking is not activated. Regenerative braking, however, is ramped down or immediately removed when antilock braking is activated.

Similarly, U.S. Pat. No. 5,472,265 discloses an antilock braking apparatus having a regenerative braking part, a second braking part, an antilock brake system part, and a braking control part in which the antilock brake system part performs an ABS control process to control a braking force produced by either the regenerative braking part or the second braking part on the wheels. The braking control part changes the braking force produced by the other braking part on the wheels to equal zero when the antilock brake system part has started performing an ABS control process.

SUMMARY OF THE INVENTION

The invention is related to a wheeled vehicle with a regenerative braking system. The preferred vehicle has least two wheels and carries one or more rechargeable batteries or another electric energy storage device. The preferred regenerative braking system includes a brake control configured for movement by a user over a movement range that includes first and second subranges. A regenerative device is associated with the batteries and at least one of the wheels for generating an electrical current by decelerating the wheel. Additionally, a processor is connected to the brake control and to the battery such that when the brake control is subjected to a first movement, preferably by positioning it in the first subrange, the processor causes the regenerative device to decelerate the vehicle and charge the batteries with the current produced. The processor is preferably also configured for activating another operation of the vehicle when the brake control is subjected to a second movement, preferably by positioning it in the second subrange. In one embodiment, the first movement is in a first direction, and the second movement is at least of a predetermined minimum rate and in a second direction opposite from the first direction.

An electric motor is operatively connected to at least one of the wheels to drive it, and a motor controller connects the batteries to the electric motor to power the motor. The preferred brake control includes a twist grip throttle, with the processor having an electrical connection to the motor controller and for causing the motor to accelerate or power the wheel when the brake control is positioned in the second subrange. In one embodiment, the processor also activates another braking system for decelerating the vehicle when the brake control is positioned in the second subrange. The first subrange preferably comprises less than about 25 percent of the range, and more preferably less than about 15 percent. The preferred brake control is resiliently biased towards a resting position between the first and second subranges.

In a preferred embodiment, the invention provides a regenerative braking system for an electric vehicle having front and rear wheels, and includes a drive wheel, an actuating device, a regenerative braking control circuit, and a power electronics circuit. The regenerative braking control circuit includes a transducer, such as a potentiometer or digital encoder or the like, a process sensor, and a microprocessor. The power electronics circuit includes a rechargeable electric power source, an electric motor, and a motor controller. The actuating device is coupled to the transducer. The transducer and process sensors signal the microprocessor which applies an algorithm to the signals and produces an output signal to the motor controller for regulating a regenerative braking torque to the drive wheel. The algorithm includes a subroutine for preventing lock-up of the drive wheel. In one embodiment, the regenerative braking system is independent of a vehicle friction brake system. In another embodiment, the regenerative braking system cooperates with a friction brake system.

The braking system applies a regenerative braking torque to the drive wheel when the transducer signals a regenerative braking command, and the process sensors signal a drive wheel velocity greater than zero. Preferably, the braking torque increases with an increase in the transducer signal as controlled by the operator, and the subroutine adjusts the braking torque when an anti-lock trigger is activated. In essence, during the regenerative braking mode, the motor act as a generator supplying current to the battery which loads down the generator, thereby causing a braking action.

In an illustrative embodiment of the invention, the process sensors comprise a rear wheel velocity sensor and a front wheel velocity sensor. The trigger activates when the front and rear wheel speeds differ by a set value. In one example, the set limit is about 5 percent. The adjustment in regenerative braking torque is related to the difference between the front and rear wheel speeds. For example, the regenerative braking torque may be determined by the antilock subroutine unless the regenerative braking torque signaled by the transducer is less than the adjusted regenerative braking torque determined by the subroutine, or the difference between the front and rear wheel speeds exceeds a predetermined limit.

Preferably, the actuating device is mechanically movable over a range of motion and is capable of being controllably positioned by a vehicle rider. In an exemplary embodiment, the actuating device is operably configured to cooperate with the transducer to signal the microprocessor. The mechanical position of the actuating device determines the transducer signal. In one embodiment, the range of motion comprises a plurality of subranges, and movement over a first subrange demands regenerative braking and movement over a second subrange demands friction braking. In one example, the first subrange comprises a displacement within about the first 25 percent of the total range, more preferably within about the first 10%, and the second subrange comprises a displacement within the remaining range of motion.

Typically, the vehicle may have a handle bar having first and second ends. In one embodiment, the actuating device is a hand brake comprising a lever located on the first or second end of the handle bar. In another embodiment, the actuating device comprises a thumb lever mounted to the handle bar and is located below the first or second end. In another embodiment, the actuating device comprises a twist-grip throttle located on one end of the handle bar for controllably accelerating or regeneratively braking the vehicle. In yet another embodiment, the actuating device comprises a foot pedal located on a side of the vehicle, preferably as well as for operating the vehicle in reverse at low speeds.

In one embodiment, the throttle is biased toward a neutral resting position and is bi-directional, being rotatable about the handle in first and second directions. Rotation of the twist-grip throttle from the neutral position in the first direction demands vehicle acceleration, and rotation of the twist-grip throttle from the neutral position in the second direction demands regenerative braking.

In another embodiment, rotation of the twist-grip throttle from the neutral position in the second direction comprises a plurality of subranges, and movement over a first subrange demands regenerative braking and movement over a second subrange demands a different form of braking. In one example, the first subrange comprises a rotational displacement within about the first 25 percent of the range, and the second subrange comprises a displacement within the remaining range of motion.

In another embodiment, the twist-grip throttle is biased toward a neutral resting position and is capable of rotating from the resting position about the handle in a first direction. Rotation of the twist-grip throttle from the resting position over a first subrange demands regenerative braking, and rotation of the throttle over a second subrange demands vehicle acceleration. In one example, the first subrange comprises a rotational displacement within about the first 25 percent of the range, more preferably within about the first 15% of the range, and the second subrange comprises a displacement within the remaining range of motion.

The present invention also relates to an operator-controlled twist-grip throttle for an electric vehicle that controls a regenerative braking system. The twist-grip throttle includes a handle, or grip, having a longitudinal axis, first and second ends, and a sector gear located at a first end of the handle and fixed thereto against relative rotation. A transducer operably designed and configured to translate a rotational position of an input gear into an output signal is also associated with, and perhaps even included within, the twist-grip throttle. The transducer may be a potentiometer or a digital encoder, or the like.

Preferably, the sector gear is operably designed and configured to mate with the input gear, and rotation of the twist-grip throttle about the handle causes the sector gear to controllably change the relative position of the input gear and signal a demand for vehicle acceleration or regenerative braking. The transducer is in electronic communication with a microprocessor and is also connected to a power lead and a ground.

In one embodiment, the handle further comprises first and second recesses within the first end of the handle which are spaced from one another and are operably designed and configured to cooperate with a bidirectional resilient member attached to a mounting part to bias the twist-grip throttle in a neutral position.

BRIEF DESCRIPTION OF THE DRAWINGS

The present invention is described in detail below with reference to the drawings in which.

DESCRIPTION OF THE PREFERRED EMBODIMENTS

In the description that follows, any reference to either orientation or direction is intended primarily for the convenience of description and is not intended in any way to limit the scope of the present invention thereto.

Figure 1:
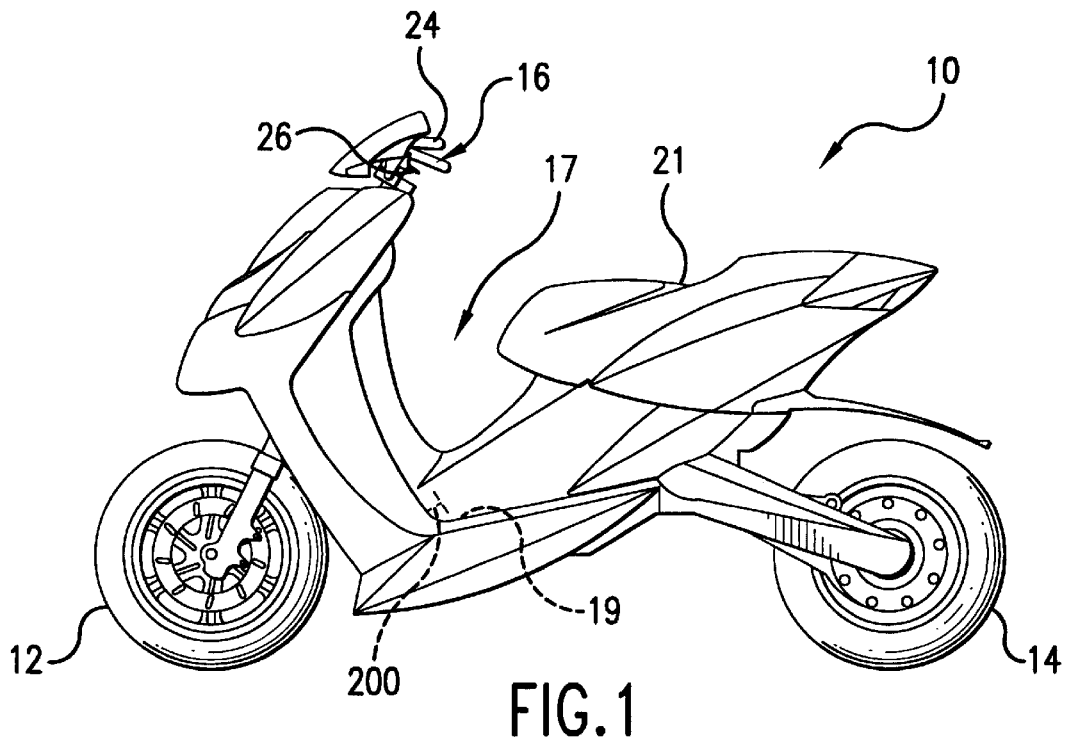
FIG. 1 is a left side view of a scooter having a regenerative braking system of the present invention.

FIG. 1 shows a scooter 10 according to the invention with two wheels, a front steerable wheel 12 and a rear drive wheel 14. The front wheel 12 is steerable by handlebar 16 and the scooter can be braked by means of a foot pedal 200. Preferably, the foot pedal 200 is located on one side of the vehicle 10 near the front of a rider's foot, so that a rider could readily press the pedal 200 with the bottom of the rider's foot. In the embodiment shown, the scooter has a pass-through 17 for facilitating mounting a rider so the rider's legs can be passed therethrough. The pass-through 17 preferably has a height of more than about half of the height between foot platform 19 and the portion 21 of the seat where the driver sits.

Figure 2:
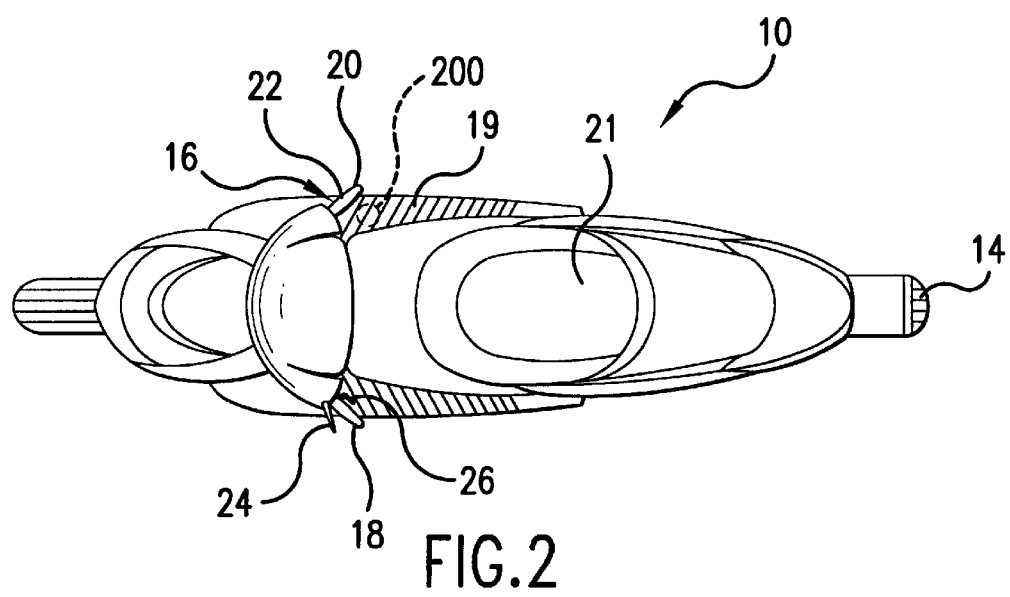
FIG. 2 is a top view of the scooter of FIG. 1.

FIG. 2 shows a handle bar 16 comprising left and right handles 18, 20. In the embodiment shown, the handle bar 16 has a twist grip throttle 22 located on the right handle 20 and a hand brake lever 24 located on the left handle 18, in a configuration typical of European motor scooters, although this positioning is altered in other embodiments, and a brake lever can be provided on both handles. Additionally, located below the handle bar 16 and extending generally parallel to the left handle 18 is a thumb-switch or thumb-lever 26. The thumb-lever 26 preferably is mounted near the handle so that a rider can readily press the lever with the thumb of the rider's hand. As discussed below, the regenerative braking system of the present invention may be actuated and controlled by a rider manipulated actuating device. Examples of actuating devices include without limitation a hand brake lever 24, a thumb-switch 26 or thumb-lever, a twist grip throttle 22 located on the handlebar 16, or the aforementioned foot pedal.

Figure 3:
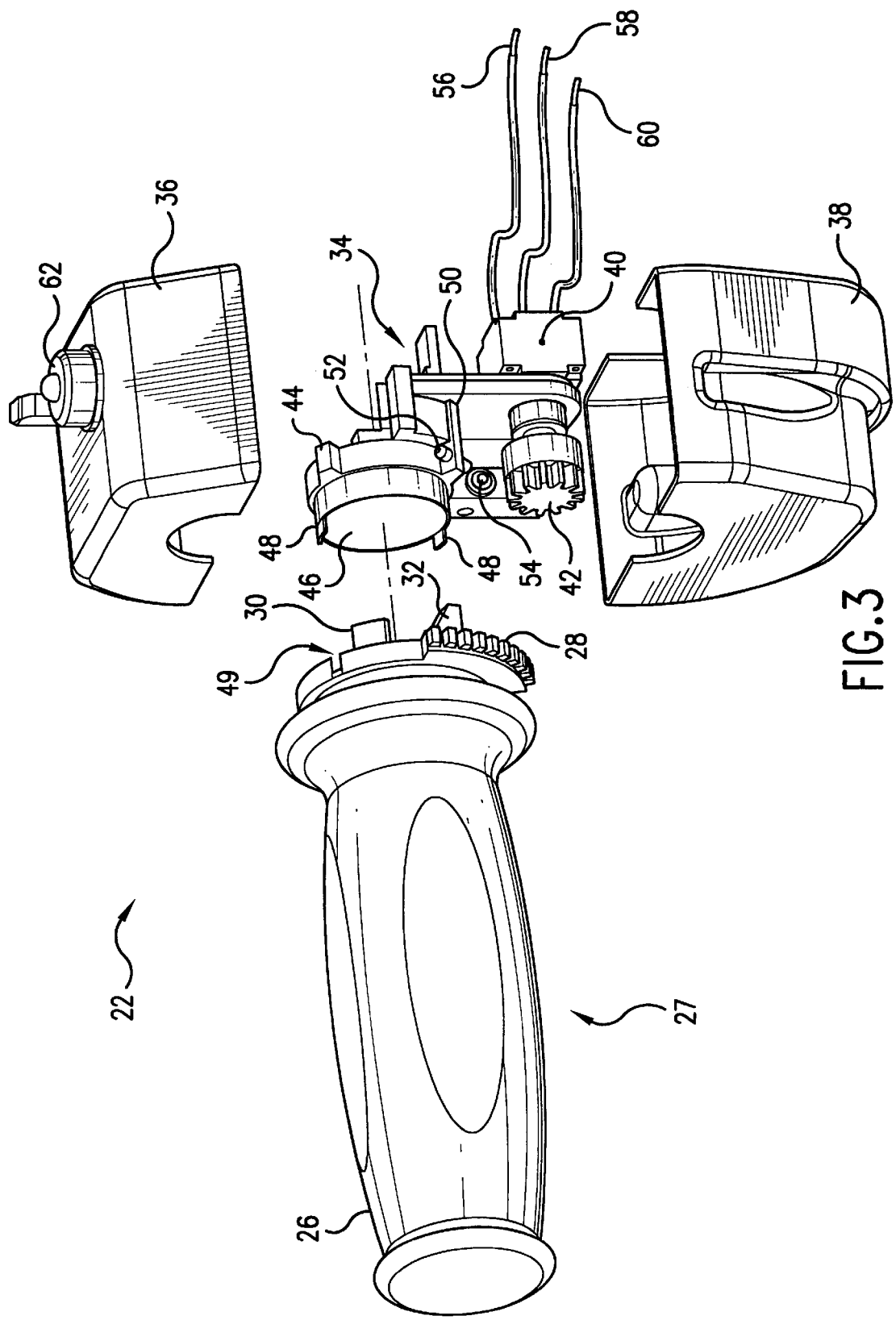
FIG. 3 is a partially exploded view of an exemplary embodiment of a twist-grip throttle for the scooter of FIG. 1.

FIG. 3 shows a partially exploded view of an illustrative embodiment of a twist grip throttle 22 configured for the right handle 20 of the scooter 10. The twist-grip throttle 22 may alternatively be configured for the left handle 18. In one embodiment, one of the twist grips controls the throttle, and the other controls the regenerative braking.

The throttle assembly includes a twist grip 26 having a sector gear 28, a throttle tab 30, and a second tab 32. The sector gear 28, throttle tab 30, and second tab 32, preferably, are fixed against relative rotation with respect to the twist grip 26. The twist grip 26 is designed and configured to cooperate with a transducer assembly 34, preferably implemented as a potentiometer assembly, and upper 36 and lower 38 covers to translate mechanical movement of the twist-grip into electronic signals for controlling scooter acceleration and regenerative braking. An emergency kill switch 62 is located on the upper throttle assembly cover 36.

The potentiometer assembly 34 is comprised of a potentiometer 40, a star gear 42, a full throttle stop 44, a twist grip mounting cylinder 46, a throttle biasing element 48, throttle biasing element 52, and a switch 54. The potentiometer 40 has three wires a power lead 56, a ground 58, and a signal wire 60. The potentiometer assembly 34 may be operably designed and configured to slidably receive the twist grip 26 on mounting part 46 and mate the star gear 42 with the sector gear 28, such that rotation of the twist grip 26 about mounting part 46 causes the star gear 42 to rotate and change the state of the potentiometer.

As shown in FIG. 3, a bidirectional, throttle-return spring 48 may be attached to mounting part 46; the ends of the spring 48 may also be operably designed and configured to mate with recesses on the twist grip 26 such as recess 49. The potentiometer assembly 34 may further be operably designed and configured to bias the twist grip 26 and sector gear 28 in one position within a set range of rotational movement. For example, the twist grip 26 may possess a range of rotational movement that extends between a first throttle stop 44 and a second throttle stop 50, and the rotational spring may be capable of bi-directionally providing resilient forces to the twist grip 26 when the twist grip 26 and sector gear 28 are displaced from a neutral position in either rotational direction.

In one embodiment, the biased rotational position of the twist grip 26, sector gear 28, and the mated star gear 42 may represent a neutral throttle position from which rotational displacement over a first direction signals acceleration demand and displacement from which in a second direction signals regenerative braking demand. In one example, rotation of the twist grip 26 about mounting part 46 counter clockwise from the neutral position, when viewed from the right side of the vehicle, translates into a potentiometer signal demanding vehicle acceleration, while rotation from the neutral position in the other direction translates into a potentiometer signal demanding regenerative braking.

In another embodiment, the biased rotational position of the twist grip 26, sector gear 28, and the mated star gear 42 might represent a neutral throttle position from which rotational displacement in one direction over a first range signals regenerative braking demand, and continued displacement in the same direction over a second range signals friction braking demand.

The above-described embodiments utilize a potentiometer as the transducer to output a signal indicative of the displacement of the twist-grip throttle. It should be kept in mind, however, that other transducers, such as a digital shaft encoder, may be used to output signal data reflective of the displacement of the throttle.

To enhance the quality of feedback to the rider regarding the relative position of the throttle, it is desirable that the biasing resistance over each range of motion controlling a different scooter function possess a different degree of resistance that is readily perceptible to the rider. For instance, motion of the twist grip demanding regenerative braking may require a greater displacing force, preferably over a lesser rotational displacement, than motion of the twist grip demanding vehicle acceleration. Biasing of the twist grip in such a fashion may be achieved by the interaction of bidirectional spring 48 with an additional resilient member that is engaged only when rotational movement of the throttle demands regenerative braking.

For example, added rotational resistance may be achieved by the interaction of tab 30 with the throttle biasing element 52. Tab 30 may be operably designed and configured to bear against the throttle biasing element 52, when the twist grip 26 is rotated from the neutral position in the second direction to demand regenerative braking. The throttle biasing element 52 may also be operably designed and configured to resist the contact forces applied by tab 30 when the twist grip 26 is rotated in this manner. To achieve this functionality, the throttle biasing element 52 may be spring loaded. In an alternative embodiment, the throttle biasing element 52 is configured for sending a signal to the regenerative braking system to engage or change the amount of regenerative braking when the throttle biasing element 52 is contacted or depressed by a portion of the throttle mechanism such as tab 30.

The degree of resistance of the biasing elements may also be operably designed and configured to provide the throttle with a specific feel. For example, the resistance to rotational displacement of the twist grip 26 may be uniform across a range of motion. Alternatively, the resistance may increase in a non-uniform fashion. The resistance to rotational displacement may also comprise linear and non linear segments.

The actuating device may be operably designed and configured to cooperate with a potentiometer to signal rider regenerative braking demand. The hand brake lever 24 may be located on the left handle bar 18 in a configuration typical of a European motor scooter and displacement of the hand brake lever 24 from a resiliently biased neutral position would controllably change the state of a potentiometer to signal regenerative braking demand. For instance, the demanded regenerative braking torque might increase relative to the magnitude of the displacement. The relationship may be defined by a mathematical equation, or empirically determined by experiment. In one example, the hand brake lever 24 actuates regenerative braking only, and the rear friction brake is eliminated. In another example, the hand brake lever 24 displacement over a first range actuates regenerative braking and lever displacement over a second range activates a conventional drum brake or a disc friction brake. For instance, a lever displacement less than ¼ of the lever travel range would signal regenerative braking and a lever displacement greater than or equal to ¼ of the lever travel range would signal conventional braking. In yet another example, displacement of the handbrake lever 24 operates regenerative braking in parallel with a conventional drum or disc friction brake. In this embodiment, the braking control module would use a duty factor map to blend regenerative and friction braking so that the implementation of regenerative braking would transparent to the rider.

Figure 4:
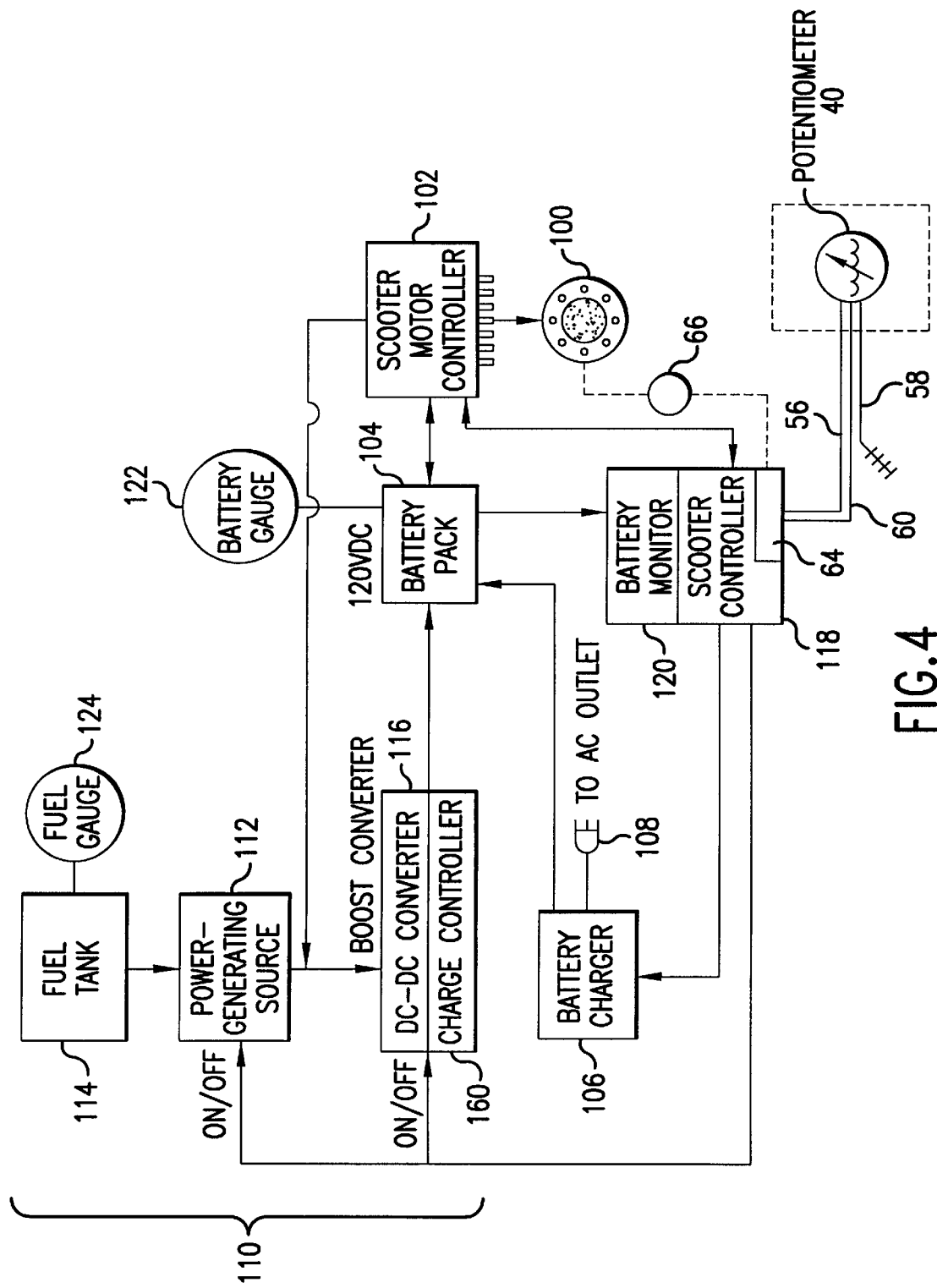
FIG. 4 is a block diagram of an exemplary electric system for the scooter of FIG. 1.

FIG. 4 presents a block diagram showing the functional components associated with the present invention. The rider inut device, including potentiometer 40, is operably configured to translate a mechanical rider input from an actuating device into an electrical signal which is transmitted to a regenerative braking control module 64 comprising a microprocessor on the scooter controller 118. The control module 64 further receives input signals from at least one process monitoring sensor 66. The process monitoring sensor 66 may provide instrumentation data such as drive wheel speed, front wheel speed, and vehicle accelerometer measurements.

In use, the regenerative braking control module 64 receives the regenerative braking system input signals, applies an algorithm to the signals, and produces an output signal to the motor controller 102 for regulating regenerative braking torque to the drive wheel. Charging of the battery pack 104 during regenerative braking is regulated by the scooter controller 118 and charging controller 160.

An electric scooter motor 100 provides the driving power to drive the scooter. Preferably scooter motor 100 is a three-phase slotted brushless permanent magnet motor, specially made by Kollmorgen Corporation (www.kollmorgen.com) for the present purposes. While Table 1 below lists the specifications of the motor used in a preferred embodiment of the present invention, it should be kept in mind that countless other specifications may also suffice. In particular, motors having different numbers of poles and having greater or lesser power and torque, peak power torque have been employed for use in connection with the present invention.

Scooter motor 100 receives a three-phase voltage from scooter motor controller 102. The motor controller has the battery DC voltage as its input and converts the battery voltage to a three-phase output to the motor. Preferably, scooter motor controller 102 outputs a modulated signal, such as pulse width modulation, to drive the scooter motor 100. The scooter motor controller 102 includes high power semiconductor switches which are gated (controlled) to selectively produce the waveform necessary to connect the battery pack 104 to the scooter motor.

Battery pack 104 preferably includes sufficient batteries connected in series to provide at least 100 VDC. The battery pack 104 preferably comprises either lead-acid batteries or Ni—Zn batteries, although other battery types such as nickel metal hydride and lithium ion can be used. Regardless of which types of batteries are used, it is crucial for the purposes of the present invention that the batteries be rechargeable. A conventional battery charger 106 is one way in which the battery pack 104 is recharged. Battery charger 106 may reside onboard the scooter and is connectable to an AC outlet via a plug 108 or the like. Alternatively, the battery charger 106 may remain off of the vehicle and be connected to the scooter only during high current charging sessions.

TABLE 1

Motor Specifications

| Characteristic | Feature |
| --- | --- |
| Type | Permanent magnet |
| Peak Power | 20 kW |
| Peak Torque | 65.6 N-m |
| Current @ Peak Torque | 325 Amps |
| Maximum Speed | 5500 RPM |

In addition to the battery charger 106, which connects to an AC outlet to recharge the battery pack 104, an onboard charging system 110 can also be incorporated on the scooter. The embodiment of FIG. 4 is a hybrid vehicle, which also includes onboard charging system that comprises an onboard power generating source 112, a fuel supply 114 which feeds the onboard power generating source 112, and a converter/charge controller 116 which transforms the output of the onboard power generating source 112 into a form suitable for charging the battery pack 104. The onboard power generating source may include a fuel cell, an internal combustion engine, or both. Other embodiments are not hybrids, and do not include an onboard power generating source.

A scooter controller 118 sends signals to the motor controller 102, the battery charger 106 (when provided onboard the scooter), the onboard power generating source 112, and the converter/charge controller 116. The charge of the battery pack is monitored via a battery monitor 120 which, in turn, is connected to the scooter controller 118 to provide information which may affect the operation of the scooter controller. The energy state of the battery pack is displayed on a battery gauge 122 so that the user can monitor the condition of the battery pack 104, much like a fuel gauge is used to monitor a gasoline powered scooter. The status of the fuel supply 114 is similarly displayed on a fuel gauge 124 for the user's convenience.

Figure 5:
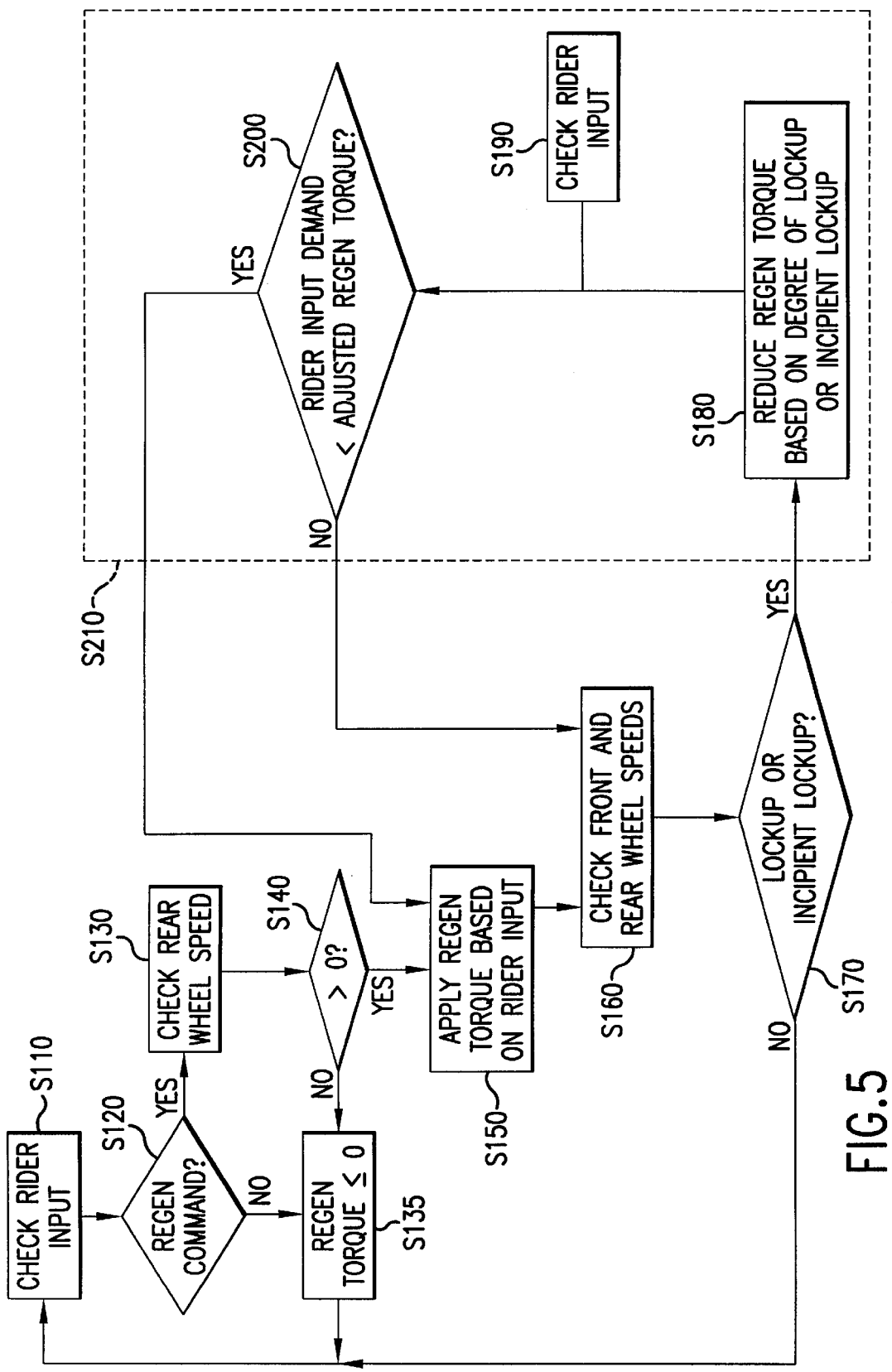
FIG. 5 is a flow chart illustrating a regenerative and anti-lock braking routine for the electric system motorcycle of FIG. 1.

FIG. 5 depicts the regenerative braking algorithm of the present invention. The algorithm preferably is implemented in software and runs on a processor associated with the scooter controller 118. For the purpose of this discussion, a velocity greater than zero indicates a wheel speed corresponding to forward movement of the vehicle. Conversely, a velocity less than zero indicates a wheel speed corresponding to backward movement of the vehicle.

According to the invention, the control module monitors the potentiometer signal S110 and determines whether the rider has demanded regenerative braking S120. If the potentiometer signal indicates that regenerative braking is demanded by the rider, the scooter controller evaluates data from the drive wheel speed sensors and determines whether the drive wheel has a velocity greater than zero S130. If the rider has demanded regenerative braking and the drive wheel velocity is not greater than zero S135, no regenerative braking torque is applied and the controller returns to step S110.

If, however, the rider has demanded regenerative braking and the drive wheel velocity is greater than zero S140, the control module commands the motor controller to apply a regenerative braking torque to the drive motor S150. The magnitude of the regenerative braking torque is determined by the control module based on the rider demand (i.e., potentiometer signal) and other operational parameters, as described in more detail below. In one embodiment, the regenerative braking torque increases with an increase in the potentiometer signal.

When regenerative braking torque is applied S150, the control module evaluates signals from front and rear wheel sensors to determine the velocity of each wheel S160. The front and rear wheel speeds are evaluated by the control module to determine whether to commence anti-lock regenerative braking S170 and anti-lock regenerative braking is started when a trigger is activated. In one embodiment, the trigger is activated when the front and rear wheel speeds differ by a set value. For example, the trigger may be programmed to activate anti-lock regenerative braking when the control module determines that the front and rear wheel speeds differ by more than 5 percent.

If lock-up conditions have not occurred or are not about to occur (i.e., the anti-lock regenerative braking trigger is not activated) the demanded regenerative braking torque remains applied to the drive wheel and an updated regenerative braking demand signal is polled S110. Alternatively, if lock-up conditions are determined by the control module (i.e., the anti-lock regenerative braking trigger is activated) the control module signals the motor controller to reduce the demanded regenerative braking torque S180.

An adjusted regenerative braking torque is determined by the control module based on a predetermined relationship between the applied regenerative braking torque and the lock-up conditions which activated the trigger. For example, a memory associated with the control module may store data $D(x1, x2, \ldots, xN)$ as a map, or look-up table, which represents the duty factors for regenerative braking torque as a function of operational data from N parameters such as detected motor speed, regenerative braking potentiometer signal, front and rear wheel velocity data, and the like. As an example, in the case where N=2, the data $D(x1, x2)$ may store information for x1=regenerative braking potentiometer signal, x2=motor speed. The control module would choose duty factor data $D(x1, x2)$ representing the adjusted regenerative braking torque that corresponds to operational data from the duty factor storage device. If any duty factor data $D(x1, x2)$ were not found in the duty factor map storage device for the given operational data, duty factor data would be calculated by interpolation to generate an adjusted regenerative braking torque, or the operational data itself may be truncated or rounded off so that it corresponds to indices in the data table $D(x1, x2)$.

After adjusting the regenerative braking torque, the control module polls the potentiometer signal S190 to determine an updated demand for regenerative braking torque. The updated demand is compared to the adjusted torque S200. In the event the updated demand is less than the adjusted torque the control module signals the motor controller to apply the updated demanded regenerative braking torque S150. Alternatively, if the updated regenerative braking torque demanded by the rider is not less than the adjusted regenerative braking torque, the control module continues to signal the motor controller to apply the adjusted regenerative braking torque.

After completing the anti-lock subroutine S210, the control module re-polls the process sensors S160 and tests the signals for the lock-up trigger condition S170. If the trigger condition is satisfied, then the applied regenerative braking torque is adjusted S180 and evaluated as described above S190, S200. If the trigger condition is not satisfied (i.e., lock up has not occurred and is not about to occur) the control module continues to signal the motor controller to apply the applied regenerative braking torque to the drive motor and returns to the start of the logic sequence S110.

Figure 6:
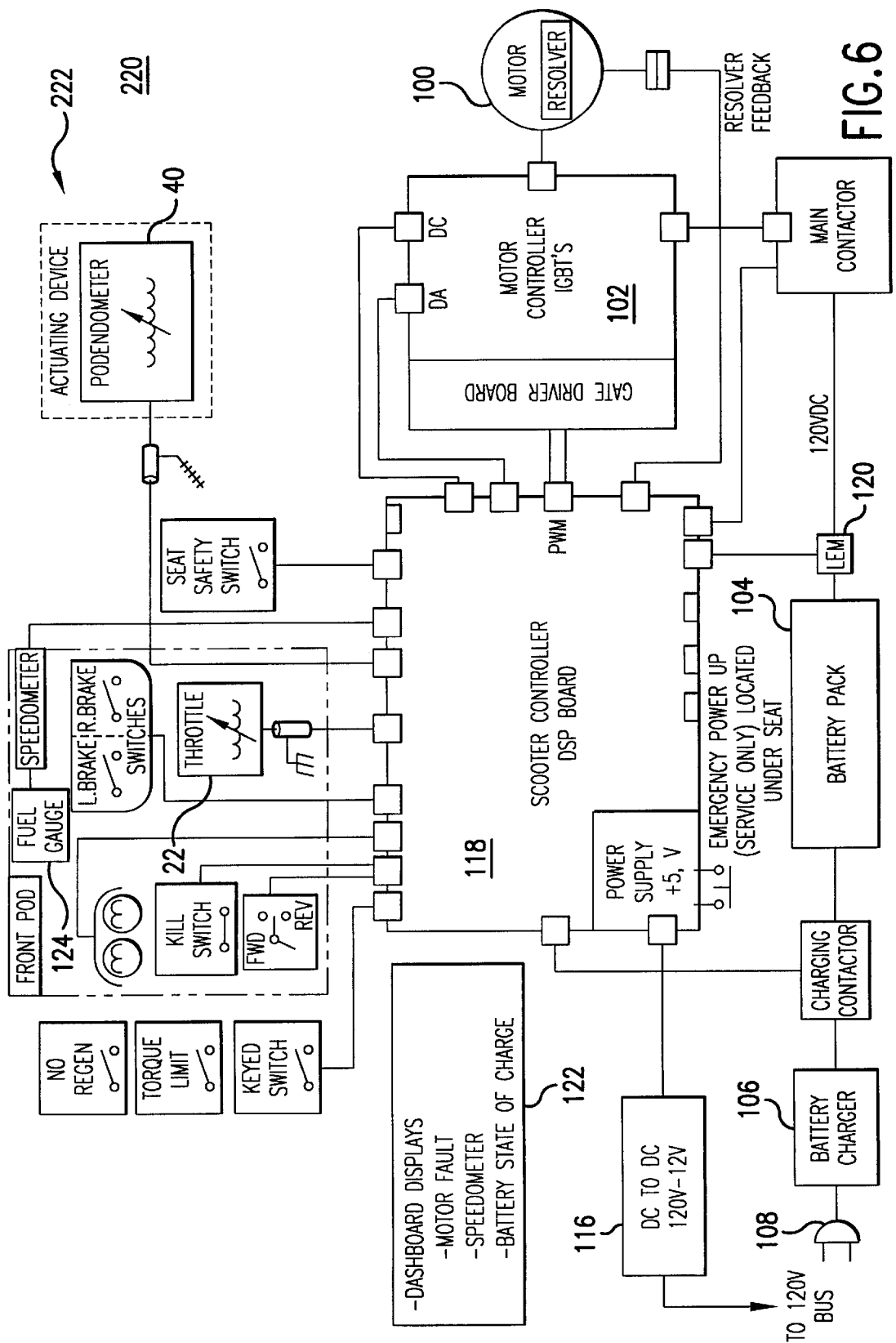
FIG. 6 is a block diagram of an electrical system for a scooter having a regenerative braking system according to the invention.

FIG. 6 presents an exemplary embodiment of an electrical system 220 for a scooter having a regenerative braking system according to the invention. In the embodiment of FIG. 6, rider controlled regenerative braking demand is effected by operation of an actuating device 222 that is separate from the vehicle acceleration throttle 22. The separate actuating device 222 can be another hand-brake, a thumb lever, or a foot pedal, among others.

As discussed above, however, the throttle may serve the dual role of demanding vehicle acceleration and also regenerative braking. In one embodiment, the throttle 22 is the bi-directional twist grip throttle of FIG. 4. As described above, the throttle is biased toward a neutral resting position and is capable of rotating about the handle in first and second directions. Rotation of the throttle 22 from the neutral position in the first direction demands vehicle acceleration, and rotation of the throttle 22 from the neutral position in the second direction demands regenerative braking. Additionally, rotation of the handle from the neutral position in the second direction may comprise a plurality of subranges. For instance, movement over a first subrange may demand regenerative braking, and movement over a second subrange may demand another type of braking. In one example, the first subrange may comprise a rotational displacement within about the first 25 percent or 10 percent of the range, and the second subrange may comprise a displacement within the remaining range of motion.

In another embodiment, the throttle 22 is biased toward a neutral resting position and is capable of rotating from the resting position about the handle in a first direction only (i.e., non-bidirectional). In such case, rotation of the throttle in the first direction from the resting position over a first subrange to first rotation position may demand regenerative braking, and further rotation of the handle from the first rotation position over a second subrange to a second rotation position may demand vehicle acceleration. In one example, the first subrange may comprise a rotational displacement within about the first 10 or 15 percent of the total range, more preferably 10 percent of the total range, and the second subrange may comprise a displacement within the remaining range of motion. In another embodiment, a brake control, such as a hand lever or foot pedal, with a first portion of the brake control travel, such as about 10 percent, activates regenerative braking, and further actuation activates one or more different types of braking, such as friction braking, in addition to or instead of the regenerative braking.

Also, the throttle 22 may allow the vehicle to have reverse capability for very low-speed maneuvering (with feet on the ground). Maximum driving torque in reverse would be greatly reduced and the vehicle speed would be limited to a walking pace. The rider might enable reverse operation via a switch on the handlebars. In one embodiment, a twist-grip throttle allowing rotational displacement in one direction will operate the vehicle in reverse when a switch on the handlebars is positioned in reverse mode. In another embodiment, the throttle twist-grip will be operable in both directions relative to the neutral resting position. Twisting the handgrip in the counter clockwise direction when viewed from the right-hand side of the vehicle will control forward throttle, while twisting the handgrip in the opposite direction will control regenerative braking in normal forward operating mode, and reverse torque in reverse mode.

In an alternative embodiment, a sensor detects the rate at which the twist-grip throttle is rotated towards its neutral position, or in a direction to demand less power to the wheel. Regenerative braking is then applied proportional to the rate of twisting of the throttle, even before the throttle is positioned in any range that is normally assigned to regenerative braking.

While the above invention has been described with reference to certain preferred embodiments, it should be kept in mind that the scope of the present invention is not limited to these embodiments. For example, a pressure transducer may be used with a hydraulic actuating device to controllably signal regenerative braking demand to the scooter controller. And, an on-board accelerometer may be used to provide an independent speed calculation for the anti-lock braking sub routine. The embodiments above can also be modified so that some features of one embodiment are used with the features of another embodiment. One skilled in the art may find variations of these preferred embodiments which, nevertheless, fall within the spirit of the present invention, whose scope is defined by the claims set forth below.

What is claimed is:

1. A vehicle, comprising:
   at least two wheels;
   a rechargeable battery; and
   a regenerative braking system comprising:
      a brake control configured for movement by a user,
      a regenerative device associated with the batteries and at least one of the wheels for generating an electrical current by decelerating the wheel, and
      a processor connected to the brake control and to the battery such that in response to first movement of the brake control, the processor causes the regenerative device to decelerate the vehicle and charge the battery with said current, wherein the processor is configured for activating another operation of the vehicle in response to a second movement of the brake control second movement.

2. The vehicle of claim 1, wherein the vehicle is a two wheeled vehicle.

3. The vehicle of claim 1, further comprising:
   an electric motor operatively connected to at least one of the wheels to drive the at least one wheel; and
   a motor controller configured to connect the battery to the electric motor to power the motor.

4. The vehicle of claim 3, wherein:
   the brake control comprises a twist grip throttle; and
   the processor has a least one electrical connection to the motor controller and is configured for causing the motor to accelerate the wheel when the brake control is positioned in the second subrange.

5. The vehicle of claim 1, wherein the processor is configured for activating another braking system for decelerating the vehicle when the brake control is positioned in the second subrange.

6. The vehicle of claim 1, wherein the first subrange comprises less than about 25 percent of the range.

7. The vehicle of claim 1, wherein the brake control is resiliently biased towards a resting position between the first and second subranges.

8. The vehicle of claim 1, wherein:
   the brake control is configured for movement by a user over a movement range that comprises first and second subranges; and
   the processor is connected to the brake control and the battery such that when the brake control is positioned in the first subrange, the processor causes the regenerative device to decelerate the vehicle and charge the battery with said current, and when the brake control is positioned in the second subrange the processor activates said other operation.

9. The vehicle of claim 1, wherein the first movement is in a first direction, and the second movement is at least of a predetermined minimum rate and in a second direction opposite from the first direction.

10. A electric vehicle, comprising:
    a vehicle frame supporting a plurality of rechargeable batteries;
    at least two wheels supportively connected to the frame;
    an electric motor operatively connected to drive at least one of the wheels;
    a motor controller configured to connect said plurality of batteries to the electric motor; and
    a regenerative braking system including:
       a processor having a least one electrical connection to the motor controller, and
       an actuating device mounted on the vehicle and connected to the processor, the actuating device being configured to:
          accelerate the vehicle in response to a first movement of actuating device, and
          apply a regenerative braking force which causes the vehicle to decelerate and the motor controller to recharge at least one of said plurality of batteries, in response to a second movement of the actuating device, while the vehicle is traveling in a forward direction.

11. The electric vehicle of claim 10, wherein the actuating device comprises a thumb-lever mounted on a handlebar of the vehicle.

12. The electric vehicle of claim 10, wherein the actuating device comprises a twist-grip throttle mounted on one end of a handlebar of the vehicle.

13. The electric vehicle of claim 12, wherein the twist grip throttle is biased toward a neutral resting position and is bi-directional, the twist grip throttle being configured to rotate from said neutral resting position:
    in a first direction to thereby accelerate the vehicle, and
    in a second direction to thereby apply the regenerative braking force.

14. The electric vehicle of claim 13, wherein the throttle comprises:
    a rotatable handle provided with a first gear fixedly mounted thereto;
    a bidirectional spring operatively engaged to the rotatable handle and configured to bias the rotatable handle towards a neutral position; and
    a transducer operatively coupled to the first gear and configured to output a signal in response to a rotational movement of the first gear; wherein
    rotation of the handle causes the first gear to activate the transducer such that the transducer outputs a signal reflective of either a position, or a change in position, of the handle.

15. The electric vehicle of claim 14, further comprising a star gear fixedly mounted relative to the bidirectional spring assembly and coupled to the first gear, the star gear being operatively engaged to the first gear such that rotation of the first gear causes a corresponding rotation of the star gear, resulting in activation of the transducer.

16. The vehicle of claim 14, wherein the transducer comprises a first transducer activated for activating the regenerative braking, and a second transducer activated for accelerating the vehicle.

17. A electric vehicle having a regenerative braking system, the vehicle comprising:
- a vehicle frame supporting a plurality of rechargeable batteries;
- at least two wheels supportively connected to the frame;
- a handlebar rotatably connected to the frame and operatively connected for steering at least one of the wheels;
- an electric motor operatively connected to drive at least one of the wheels;
- a motor controller configured to connect said plurality of batteries to the electric motor; and
- a regenerative braking system including:
  - a processor having at least one electrical connection to the motor controller, and
  - a twist-grip throttle mounted on a handlebar of the vehicle and connected to the processor, the twist-grip throttle being configured to:
    - accelerate the vehicle in response to a first movement of the twist-grip throttle, and
    - apply a regenerative braking force which causes the vehicle to decelerate and the motor controller to recharge at least one of said plurality of batteries, in response to a second movement of the twist-grip throttle while the vehicle is traveling in a forward direction.

18. The electric vehicle of claim 17, further comprising a transducer operatively coupled to the twist-grip throttle, the transducer configured to provide an electrical signal to the processor reflective of a position, or change in position, of the twist-grip throttle.

19. The electric vehicle of claim 18, wherein the transducer comprises a potentiometer.

20. The electric vehicle of claim 18, wherein the transducer comprises a digital encoder.

21. The electric vehicle of claim 17, further comprising at least one separate brake control configured for decelerating the vehicle with a friction brake system independently of the regenerative braking force.

22. The electric vehicle of claim 21, wherein the at least one separate brake control cooperates with the regenerative braking system to decelerate the vehicle.

23. The electric vehicle of claim 21, wherein the separate brake control comprises a handbrake or a foot brake.

24. The electric vehicle of claim 17, wherein:
the twist grip throttle is biased toward a neutral resting position and is bi-directional, the twist grip throttle being configured to rotate from said neutral resting position;
in a first direction to thereby accelerate the vehicle, and
in a second direction to thereby apply the regenerative braking force.

25. The electric vehicle of claim 24, wherein:
the twist-grip throttle is rotatable in the second direction from the neutral position over a range of motion comprising a plurality of subranges, and
movement over a first subrange demands regenerative braking and movement over a second subrange demands another mode of braking.

26. The electric vehicle of claim 25, wherein the first subrange comprises a displacement within about the first 25 percent of the range of motion, and the second subrange comprises a displacement within a remaining range of motion.

27. The electric vehicle of claim 25, wherein the throttle and controller are configured such that rotation of the twist-grip throttle in the second direction while the vehicle is stationary, causes the vehicle to move in a reverse direction.

28. The electric vehicle of claim 17, wherein the twist grip throttle is biased toward a neutral resting position and is configured to rotate from the neutral resting position in a first direction, wherein rotation of the throttle from the neutral resting position over a first subrange in the first direction demands regenerative braking, and further rotation of the handle over a second subrange in said first direction demands vehicle acceleration.

29. The electric vehicle of claim 28, wherein the first subrange comprises a rotational displacement within about the first 25 percent of the range, and the second subrange comprises a displacement within the remaining range of motion.

30. The electric vehicle of claim 29, further comprising an anti-lock braking system including:
- a rear wheel velocity sensor and a front wheel velocity sensor; and
- a processor having anti-lock braking software code configured to process velocity sensor inputs and control an applied braking force in response thereto, wherein
  the anti-lock braking system is activated when front and rear wheel velocities differ by a predetermined amount,
  wherein activation of the anti-lock braking system adjusts a torque applied by the regenerative braking system by an amount which depends on the difference between front and rear wheel velocities.

* * * * *